United States Patent [19]
Boutaghou et al.

[11] Patent Number: 5,936,801
[45] Date of Patent: Aug. 10, 1999

[54] HEAD SLIDER WITH PARTIALLY RECESSED MAGNETORESISTIVE ELEMENT

[75] Inventors: Zine-Eddine Boutaghou, Vadnais Heights; Mark J. Schaenzer, Eagan; Subrahmanyan Nagarajan, Burnsville, all of Minn.

[73] Assignee: Seagate Technology, Inc., Scotts Valley, Calif.

[21] Appl. No.: 08/928,008

[22] Filed: Sep. 11, 1997

Related U.S. Application Data

[60] Provisional application No. 60/041,944, Apr. 4, 1997, abandoned.

[51] Int. Cl.⁶ ............................... G11B 5/60; G11B 5/39; G11B 5/255
[52] U.S. Cl. ..................... 360/103; 360/113; 360/122
[58] Field of Search ............................. 360/103, 122, 360/113, 126

[56] References Cited

U.S. PATENT DOCUMENTS

| | | | |
|---|---|---|---|
| 4,523,243 | 6/1985 | Billington | 360/113 |
| 4,674,875 | 6/1987 | Koizumi | 356/237 |
| 4,881,136 | 11/1989 | Shiraishi et al. | 360/25 |
| 4,931,338 | 6/1990 | Toffle | 428/65 |
| 5,063,712 | 11/1991 | Hamilton et al. | 51/67 |
| 5,410,439 | 4/1995 | Egbert et al. | 360/75 |
| 5,412,519 | 5/1995 | Buettner et al. | 360/73.03 |
| 5,423,111 | 6/1995 | Mori | 29/90.01 |
| 5,452,166 | 9/1995 | Aylwin et al. | 360/122 |
| 5,527,110 | 6/1996 | Abraham et al. | 374/5 |
| 5,528,922 | 6/1996 | Baumgart et al. | 73/1 J |
| 5,531,016 | 7/1996 | Postma et al. | 29/603.16 |
| 5,617,273 | 4/1997 | Carr et al. | 360/103 |
| 5,673,156 | 9/1997 | Chen et al. | 360/103 |
| 5,777,824 | 7/1998 | Gray | 360/103 |
| 5,825,593 | 10/1998 | Mowry | 360/126 |

FOREIGN PATENT DOCUMENTS

| | | | |
|---|---|---|---|
| 0 702 357 | 3/1996 | European Pat. Off. | |
| 64-037703 | 2/1989 | Japan | 360/103 |
| 03-296907 | 12/1991 | Japan | 360/122 |
| 05-225528 | 9/1993 | Japan | |
| 06-028651 | 2/1994 | Japan | 360/103 |
| 06-150278 | 5/1994 | Japan | 360/103 |

OTHER PUBLICATIONS

Abstract of European Patent No. EP000702357A2 to Yoda et al., Mar. 20, 1996.

*Primary Examiner*—Craig A. Renner
*Attorney, Agent, or Firm*—Westman, Champlin & Kelly, P.A.

[57] ABSTRACT

A head slider for use in a disc drive data storage system includes a slider body substrate having a cavity formed therein. A transducer is positioned in the head slider such that walls of the cavity in the slider body substrate protect the transducer from contact with asperities on a surface of a data storage disc.

2 Claims, 4 Drawing Sheets

HEAD SLIDER WITH PARTIALLY RECESSED MAGNETORESISTIVE ELEMENT

The present application claims the benefit it of earlier filed U.S. Provisional application Ser. No. 60/041,944, ABN entitled "RECESSED MAGNETIC TRANSDUCER FOR REDUCED ASPERITY SENSITIVITY", filed Apr. 4, 1997.

BACKGROUND OF THE INVENTION

The present invention relates generally to disc drive data storage systems. More particularly, the present invention relates to a head slider having a transducer recessed such that it is protected by a cavity formed in the ceramic slider body substrate in order to reduce asperity sensitivity.

The data density of a high-performance disc drive is highly dependent upon the separation distance between the recording head and the recording surf ace. Currently, this separation distance is maintained by tightly controlling manufacturing tolerances of the components, such as the heads and the discs. Even with these tight tolerance controls, there are increasing instances of the magnetoresistive (MR) element striking asperities on the disc. These asperities have several sources, some of which include particles embedded on the disc, blisters on the disc, surface contamination from the disc drive assembly process, smears and contamination.

When an MR element strikes an asperity, there occurs a momentary heating of the MR element which increases the resistance of the MR element. This increase in resistance leads to errors in the readback data signal. Improvements have been made to reduce the level of thermal asperities that impact the drive performance. These improvements include disc surface finish, correction algorithms in the electronics, and increasing the spacing or distance between the MR element and the disc surface (either by increasing the fly height or by increasing the recession of the MR element). While these improvements have been sufficient in the past, the laws of physics dictate that the spacing distance between the MR element and the disc surface must be reduced in order to increase the data density on the disc. Therefore, a method of protecting the MR element while reducing the fly height of the head and/or the depth of the recession of the MR element would be a significant advance in the art.

SUMMARY OF THE INVENTION

A head slider for use in a disc drive data storage system is disclosed. The head slider includes a slider body substrate having a cavity formed therein. A transducer is positioned in the head slider such that walls of the cavity in the slider body substrate protect the transducer from contact with asperities on a surface of a data storage disc.

DETAILED DESCRIPTION OF THE PREFERRED EMBODIMENTS

The present invention is based in part upon the recognition that the MR element can be protected from thermal asperities by etching a cavity into the slider body substrate prior to the wafer deposition process. Thus, the ceramic substrate provides support for the MR element. The cavity dimensions can be optimized to provide maximum protection for the MR element. By optimizing the cavity dimensions and the air bearing design, it may be practical to use the head in a virtual contact recording (VCR) system. The cavity in the head sliders of the present invention provides support on the sides of the MR element. The walls of the cavity surrounding the MR element will contact many of the asperities, thus allowing the MR element to ride above the defect and avoid a direct thermal asperity contact. The concept of the present invention can be used with a wide range of air bearing geometries.

Figure 1:
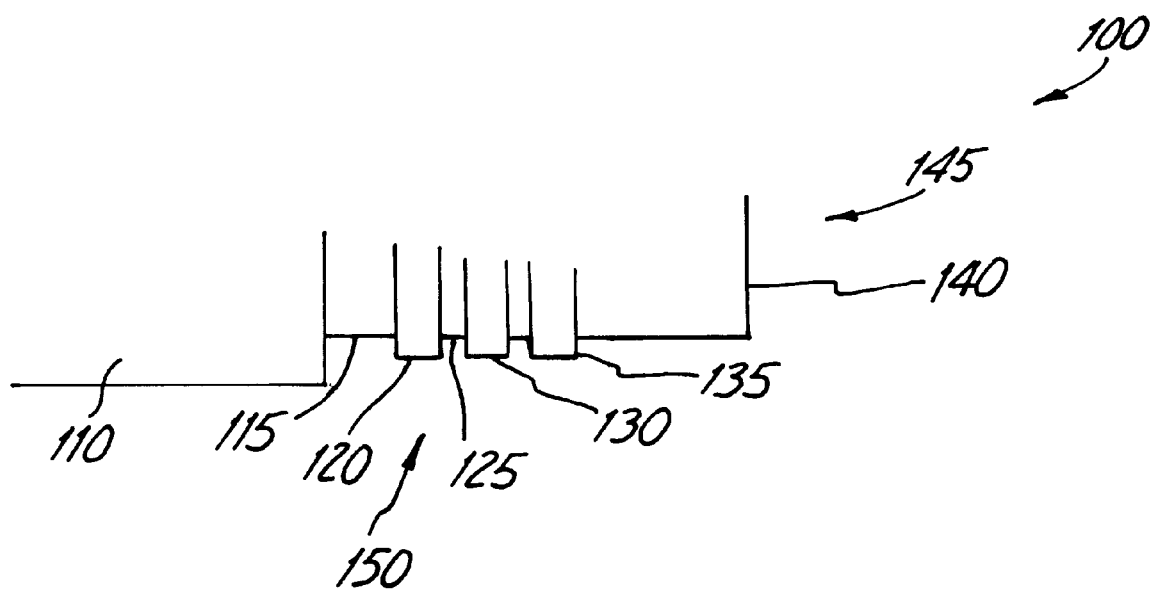
FIG. 1 is a diagrammatic side view of a portion of a prior art disc drive data storage system head slider.

FIG. 1 is a diagrammatic side view of a prior art head slider, without the benefit of the present invention. Prior art head slider 100 has a ceramic substrate 110 on which the various standard recording head layers are deposited. In the particular example illustrated in FIG. 1, these layers include base coat 115, lower shield 120, MR element 125, mid shield 130, top pole 135 and overcoat 140. The layers are deposited such that they are built up from a planar end of ceramic substrate 110 toward end 145 which will eventually correspond to the trailing edge of head slider 100. Bottom region 150 will eventually correspond to the air bearing surface (ABS) of head slider 100.

During the lapping process used to achieve the desired MR or inductive transducer dimensions, the deposited material, insulators and metal layers are eroded slightly. This erosion of the MR element 125 provides a separation space between the MR element and the plane of the ABS. However, head slider 100 flies at a pitch angle during operation. Despite the separation of MR element 125 from the plane of the ABS, this causes the MR element 125 to be exposed to direct contact with defects protruding above the surface of the disc.

From FIG. 1, it can be seen that MR element 125 is recessed from the plane of the ABS. While not necessarily drawn to scale, the MR element is typically recessed by between about 0.2 microinches and about 0.5 microinches (between about 50 Å and 125 Å). Slider base coat 115 is typically recessed by between about 0.4 microinches and about 0.8 microinches (100 Å to 200 Å). With the head slider flying at a pitch angle of approximately 150 micro radians, this leads to MR element 125 being exposed to direct contact with thermal asperities on the disc.

Figure 2:
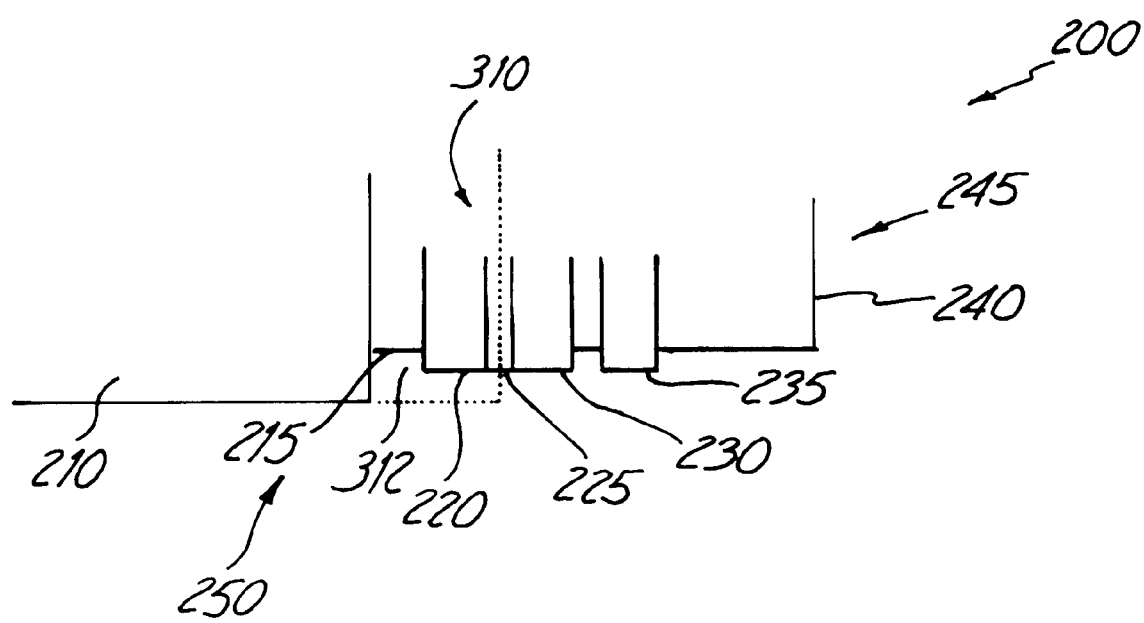
FIG. 2 is a diagrammatic side view of a disc drive data storage system head slider according to the present invention having an MR element positioned in or adjacent to a cavity formed in the ceramic substrate.

FIG. 2 is a diagrammatic side view of head slider 200 in accordance with preferred embodiments of the present invention. Like prior art head slider 100, head slider 200 includes a ceramic substrate 210 having multiple layers deposited thereon to form the read and/or write transducers.

In the particular embodiment of head slider 200 illustrated, the head slider includes base coat 215, lower shield 220, MR element 225, mid shield 230, top pole 235 and overcoat 240. As before, the layers are built-up on the ceramic substrate toward end 245 of head slider 200 which will eventually become the trailing edge. Likewise, region 250 of the head slider 200 which will eventually become the ABS can be seen.

Head slider 200 differs significantly from prior art head slider 100 in that it includes a cavity 310 (best illustrated in FIGS. 3–7) having cavity walls 312 and 314 which protect the MR element 225. One or more of the layers are formed at least partially within cavity 310. In preferred embodiments, MR element 225 is formed either partially or entirely within cavity 310. However, in other embodiments, MR element 225 is simply formed adjacent to cavity 310 such that cavity walls 312 and 314 can support MR element 225 and provide MR element 225 protection from contact with asperities on the surface of a disc. In the particular embodiment shown, base coat 215, lower shield 220 and at least a portion of MR element 225 are formed within cavity 310. The dotted lines in FIG. 2 indicate that cavity wall 312 extends such that layers 215, 220 and 225 would not be visible from this viewing angle. However, despite being positioned behind cavity wall 312, base coat 215, lower shield 220 and MR element 225 are shown in FIG. 2 in order to best illustrate the invention.

Figure 3:
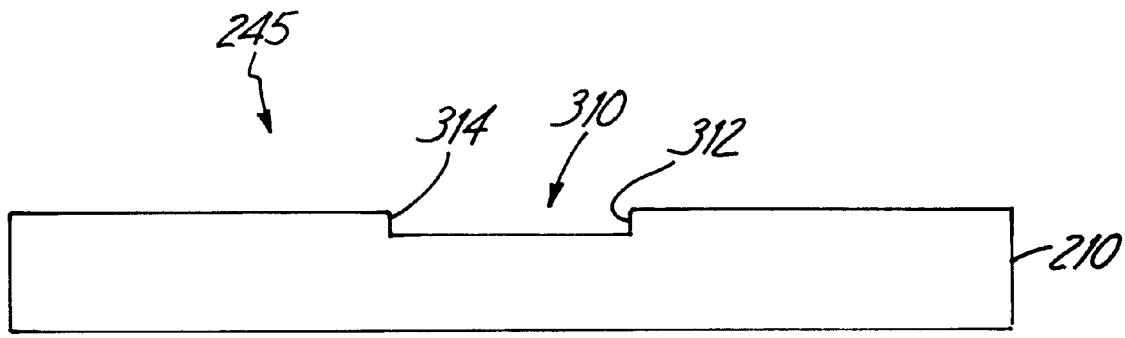
FIG. 3 is a diagrammatic view illustrating a first step in a method of fabricating the head sliders of the present invention.

FIGS. 3–7 illustrate various steps in a method of fabricating head slider 200 in accordance with preferred embodiments of the present invention. As illustrated in FIG. 3, a first step in the wafer fabrication process can be to etch cavity 310 into ceramic substrate 210, forming side walls 312 and 314. A typical depth of cavity 310 will be approximately five microns. However, other cavity depths can be used as well. Formation of cavity 310 in ceramic substrate 210 can easily be accomplished using a photo lithography and ion milling process.

Figure 4:
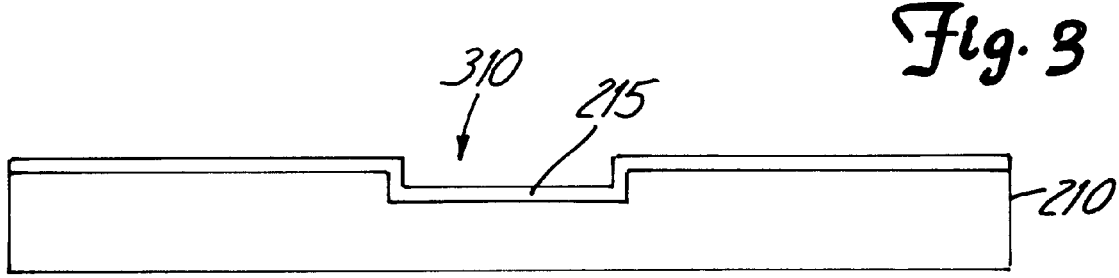
FIG. 4 is a diagrammatic view illustrating a second step in a method of fabricating the head sliders of the present invention.

Next, as illustrated in FIG. 4, base coat insulation layer 215 is deposited on ceramic substrate 210 such that it at least partially fills cavity 310. The material for base coat layer 215 can be $Al_2O_3$, for example. One preferred thickness for base coat layer 215 is two microns. However, other thicknesses can be used as well.

Figure 5:
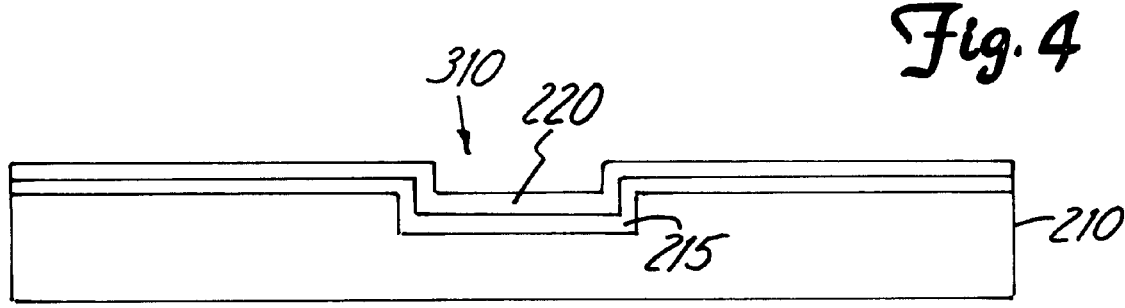
FIG. 5 is a diagrammatic view illustrating a third step in a method of fabricating the head sliders of the present invention.

Next, as illustrated in FIG. 5, lower shield 220 is deposited on top of base coat layer 215. In one possible embodiment, lower shield 220 is deposited such that it has a thickness of approximately three microns. Thus, lower shield 220 and base coat 215 substantially fill cavity 310.

Figure 6:
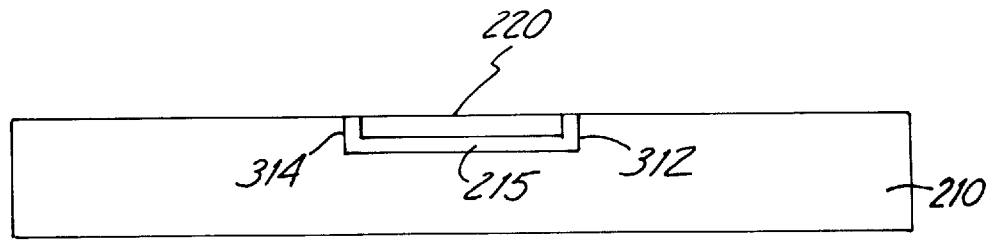
FIG. 6 is a diagrammatic view illustrating a fourth step in a method of fabricating the head sliders of the present invention.

Next, as illustrated in FIG. 6, lower shield 220, and possibly base coat layer 215 are planarized using a chemical-mechanical polish (CMP) or other process. The planarization process removes the lower shield and base coat layer 215 adjacent to what will eventually be the active region of the MR element. This is similar to current MR process steps. The CMP polish removes the lower shield and base coat, which is over the non-recessed area. After this planarization step, the wafer is processed in the normal fashion. This planarization step provides a highly polished surface which is required for high performance MR layers.

Once lower shield 220 is planarized, the normal wafer fabrication steps are implemented to complete the wafer. As illustrated in the ABS view of FIG. 7, in the particular embodiment shown, this includes deposition of MR element 225, mid shield 230, top pole 235, overcoat 240 and any other insulating or other layers desired.

Figure 7:
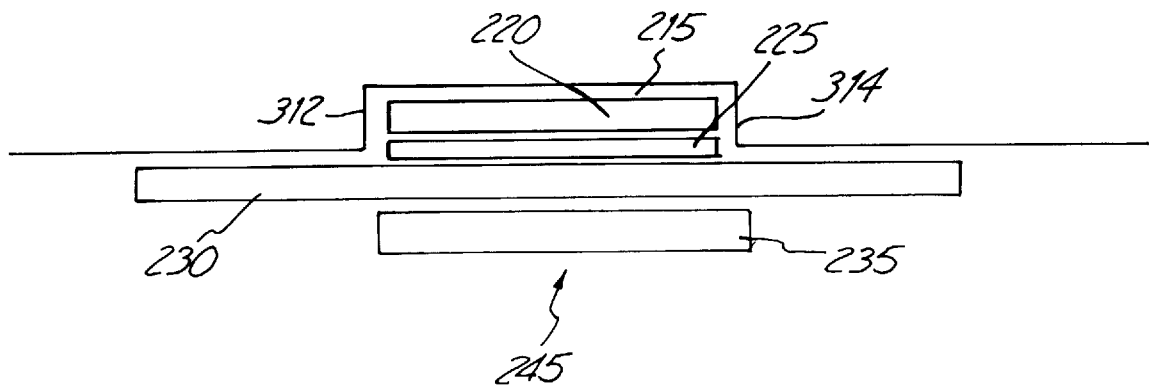
FIG. 7 is a diagrammatic air bearing surface view of a portion of the head slider of the present invention illustrating the MR element positioned within or immediately adjacent to a cavity formed in the ceramic substrate.

As can be seen in each of FIGS. 2 and 7, cavity walls 312 and 314 will provide support for MR element 225 to ride over bumps and defects on the disc. This will reduce the occurrence of thermal asperity hits on the MR element.

The MR head sliders of the present invention are easily fabricated with manufacturing processes commonly used in the recording head industry. The processes required are also compatible with current process requirements, specifically the planarization step, which is required for the highest performance MR heads in the industry. By providing the protective cavity for the MR element, it is possible to develop a head and disc combination that can be used in a VCR system. The walls of the cavity will provide support for the flying head to ride over defects in the disc. Thus supported, the MR element recess from the ABS can be eliminated or reduced.

Although this system is described for an MR head, it can also be used to protect the transducer in an inductive head. For example, there is a class of inductive heads which has a cavity recessed into a cavity in the thick base coat layer. Using the concepts of the present invention, the thick base coat could be replaced by the cavity in the ceramic, thus providing a supported inductive head for a contact recording system. Also, the cavity formed in the ceramic substrate is a low stress area. The ion milling process results in a surface which is nearly stress free. This stress neutral region is ideal for the MR element. The ion milled surface removes the mechanical stress from the lapping process.

Although the present invention has been described with reference to preferred embodiments, workers skilled in the art will recognize that changes may be made in form and detail without departing from the spirit and scope of the invention.

What is claimed is:

1. A head slider for use in a disc drive data storage system, the head slider comprising:
   a ceramic slider body substrate having a cavity formed therein, the cavity extending from an opening facing a trailing edge end of the head slider toward a leading edge end of the head slider;
   a base coat layer formed at least partially within the cavity;
   a shield layer formed on the base coat layer at least partially within the cavity; and
   a magnetoresistive element (MRE) formed on the shield layer at a position which is partially recessed within the cavity and extends partially outside of the cavity toward the trailing edge end such that walls of the cavity in the slider body substrate protect the MRE from contact with asperities on a surface of a data storage disc.

2. A disc drive data storage system comprising:
   a data disc having data stored on a surface thereof, the surface of the disc also having defects protruding therefrom; and
   a head slider adapted to read the data stored on the surface of the disc, the head slider comprising:
   a slider body substrate;
   a cavity formed in the slider body substrate;
   a base coat layer formed at least partially within the cavity;
   a shield layer formed on the base coat layer at least partially within the cavity; and
   a magnetoresistive element (MRE) formed on the shield layer at a position which is partially recessed within the cavity and extends partially outside of the cavity such that walls of the cavity protect the MRE from contact between the head slider and the defects protruding from the surface of the disc.

* * * * *